United States Patent
Balakrishnan et al.

(10) Patent No.: US 11,954,033 B1
(45) Date of Patent: Apr. 9, 2024

(54) PAGE RINSING SCHEME TO KEEP A DIRECTORY PAGE IN AN EXCLUSIVE STATE IN A SINGLE COMPLEX

(71) Applicant: Advanced Micro Devices, Inc., Santa Clara, CA (US)

(72) Inventors: Ganesh Balakrishnan, Austin, TX (US); Amit Apte, Austin, TX (US); Ann Ling, Santa Clara, CA (US); Vydhyanathan Kalyanasundharam, Santa Clara, CA (US)

(73) Assignee: Advanced Micro Devices, Inc., Santa Clara, CA (US)

(*) Notice: Subject to any disclaimer, the term of this patent is extended or adjusted under 35 U.S.C. 154(b) by 0 days.

(21) Appl. No.: 17/957,823

(22) Filed: Oct. 19, 2022

(51) Int. Cl.
*G06F 12/0815* (2016.01)

(52) U.S. Cl.
CPC ................ *G06F 12/0815* (2013.01)

(58) Field of Classification Search
CPC ............................................. G06F 12/0815
See application file for complete search history.

(56) References Cited

U.S. PATENT DOCUMENTS

| | | | |
|---|---|---|---|
| 9,311,238 B2* | 4/2016 | Shum | G06F 12/0833 |
| 2008/0155200 A1* | 6/2008 | Conway | G06F 12/0831 |
| | | | 711/146 |
| 2017/0177484 A1* | 6/2017 | Conway | G06F 12/0833 |
| 2018/0365151 A1* | 12/2018 | Zoellin | G06F 12/0822 |

* cited by examiner

*Primary Examiner* — Jason W Blust
(74) *Attorney, Agent, or Firm* — Greenberg Traurig, LLP

(57) ABSTRACT

A method includes, in a cache directory, storing an entry associating a memory region with an exclusive coherency state, and in response to a memory access directed to the memory region, transmitting a demote superprobe to convert at least one cache line of the memory region from an exclusive coherency state to a shared coherency state.

20 Claims, 6 Drawing Sheets

US 11,954,033 B1

PAGE RINSING SCHEME TO KEEP A DIRECTORY PAGE IN AN EXCLUSIVE STATE IN A SINGLE COMPLEX

BACKGROUND

Modern computing systems have multiple central processing units (CPUs) that typically include and rely on multiple caches in a cache hierarchy to improve processor and memory performance. Compared to main memory, a cache is a smaller and faster memory device that stores data that is frequently accessed so the data may be accessed with low latency. Such cache devices are often implemented in static random access memory (SRAM) and are typically located between a processing unit that issues memory requests and the main memory device. A memory-side cache is a dedicated cache attached to a particular memory device or partition of memory that caches data being written to and read from the memory device by other devices.

In multi-node computer systems, special precautions must be taken to maintain coherency of data that is being used by different processing nodes. For example, if a processor attempts to access data at a certain memory address, it must first determine whether the data is stored in another cache and has been modified. To implement this cache coherency protocol, caches typically contain multiple status bits to indicate the status of the cache line to maintain data coherency throughout the system. One common coherency protocol, for example, is the "MOESI" protocol, where each letter represents a state of the cache line. These states are as follows: the cache line has been modified (M), that the cache line is exclusive (E) or shared (S), or that the cache line is invalid (I). The owned (O) state indicates that the line is modified in one cache, that there may be shared copies in other caches, and that the data in memory is stale. Each cache line includes status bits in a cache directory, which keeps track of the cache lines that are currently in use by the system, to indicate which MOESI state the line is in.

Managing a cache directory scheme in a multiprocessor system has become difficult based on the various types of processing demands and the increase in cache and main memory sizes.

BRIEF DESCRIPTION OF THE DRAWINGS

The implementations illustrated in the figures of the accompanying drawings herein are by way of example and not by way of limitation.

DETAILED DESCRIPTION

Figure 1:
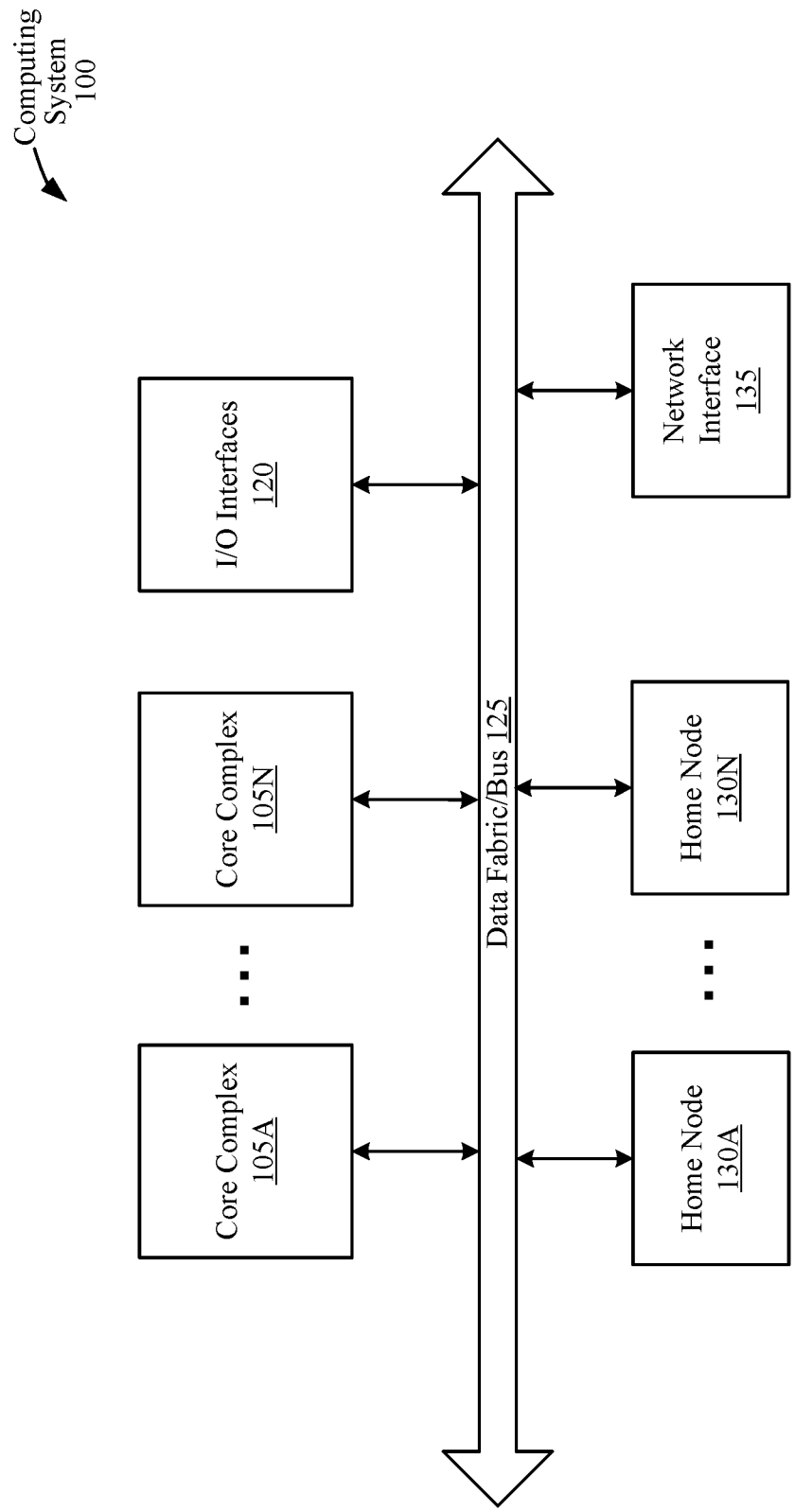
FIG. 1 is a block diagram of an implementation of a computing system.

The following description sets forth numerous specific details such as examples of specific systems, components, methods, and so forth, in order to provide a good understanding of the implementations. It will be apparent to one skilled in the art, however, that at least some implementations may be practiced without these specific details. In other instances, well-known components or methods are not described in detail or are presented in a simple block diagram format in order to avoid unnecessarily obscuring the implementations. Thus, the specific details set forth are merely exemplary. Particular implementations may vary from these exemplary details and still be contemplated to be within the scope of the implementations.

Computer systems use main memory that is typically formed with inexpensive and high density dynamic random access memory (DRAM) chips. However DRAM chips suffer from relatively long access times. To improve performance, data processors typically include at least one local, high-speed memory known as a cache. In a multi-core data processor, each data processor core may have its own dedicated upper-level cache, while lower level caches are shared by data processor cores. For example a typical configuration includes two data processor cores each of which have their own dedicated L1 cache but share L2 and L3 caches.

In more advanced computing systems, each multi-core processor can itself be interconnected with one or more other multi-core processors using a high-speed data link to form a data processing fabric. Within this data processing fabric, individual multi-core processors are interconnected to each other and to their own local memory. All local memory together forms a memory space available to any of the processors. However, since the memory is physically distributed, the memory access time seen by each processor depends on whether the memory is local or remote. Thus this architecture is known as a non-uniform memory access (NUMA) architecture.

In computer systems using the NUMA architecture, special precautions must be taken to maintain coherency of data that may be used by different processing nodes. For example, if a processor attempts to access data at a certain memory address, it must first determine whether the data is stored in another cache and has been modified. To implement this cache coherency protocol, caches typically contain multiple status bits to indicate the status of the cache line to maintain data coherency throughout the system. According to the MOESI protocol, each cache line includes status bits to indicate which MOESI state the line is in, including bits that indicate that the cache line has been modified (M), that the cache line is exclusive (E) or shared (S), or that the cache line is invalid (I). The Owned (O) state indicates that the line is modified in one cache, that there may be shared copies in other caches and that the data in memory is stale.

To maintain coherency, these systems use probes to communicate between various caches within the computer system. A "probe" is a message passed from a coherency point (e.g., a coherent master or slave) in the computer system to one or more caches in the computer system to determine if the caches have a copy of a block of data and optionally to indicate the state into which the cache should place the block of data. After a processing node receives a probe, it responds to the probe by taking appropriate action.

In one implementation, memory access requests directed to memory are forwarded to a cache directory, where a lookup of the requested address is performed to determine which caches are caching the data. Probes can then be sent to these caches to perform appropriate actions for maintaining coherency. For example, the cache directory may contain information indicating that various subsystems contain shared copies of a block of data. In response to a command for exclusive access to that block, invalidation probes may be conveyed to the other sharing subsystems so they can invalidate their respective copies of the block.

The bandwidth associated with the network that interconnects the processing nodes can quickly become a limiting factor in performance, particularly for systems that employ large numbers of processors or when a large number of probes are transmitted during a short period. In such systems, the cache directory is used as a probe filter to reduce the bandwidth requirements by filtering out unnecessary probes. For example if a cache line is designated as read-only, then the memory controller associated with a requesting processor core does not need to send a probe to determine if another processing node that has a copy of the cache line has modified the data. However, while the probe filter can reduce system traffic and access latency, it can consume a large amount of storage space to maintain the state of all cache lines in the system. Moreover if the size of the memory that needs to be looked up is too large, the probe filter may add a clock cycle delay between an access request and the determination that no probe needs to be issued.

Some implementations employ a region-based probe filter design as a compromise between area (and its associated issues, such as power consumption, timing, yield, etc.) and accuracy. As the number of CPUs, respective caches, and cache sizes grows larger, the cache directories also scale up to track a larger number of entries. One implementation of a cache directory is accessed on a per cache line basis to determine where the line has been cached in the system and the line's current state to correctly filter out snoops as memory requests are received. In contrast, a region-based probe filter reduces the amount of chip area consumed by the cache directory by tracking regions of memory corresponding to groups of cache lines in the system instead of a single cache line. In this way, decisions may be made collectively for the entire group of cache lines. In one implementation, each region in a region-based probe filter is associated with one of the following coherency states:

Exclusive: Every line in the region is owned by a single core complex.

Shared: Multiple core complexes have lines in the region. The same line may be shared among multiple core complexes (true sharing), or multiple core complexes may each own a different line in the same region (false sharing).

Clean: Cannot be exclusive (e.g., "clean shared" (CS)), and are unmodified relative to the backing data in memory.

Dirty: Can be exclusive or shared (e.g., "dirty exclusive" (DE) or "dirty shared" (DS)). Dirty lines have been modified, and are known to be dirty or are presumed dirty because they may have changed without the probe filter's knowledge.

However, the region-based probe filter design can result in performance issues when clean data is widely shared among multiple core complexes, due to the lack of per-line accuracy in coherency state tracking. A core complex brings a block of data into its cache subsystem by issuing a data fetch opcode (e.g., RdBlkL), which attempts to return an exclusive line whenever possible. However, the exclusive line can be silently modified (with its coherency state upgraded to M) without the probe filter's knowledge.

When the region is subsequently accessed from another core cache complex, the region-based probe filter is not able to determine whether the block of data is clean or dirty due to the lack of per-line fidelity. Probes are therefore issued for maintaining correctness, unless a supporting line-based probe filter entry is available. While the system may include a line-based probe filter, these are typically sized for communication variables and will be thrashed by workloads having a large memory footprint. Unavailability of the line-based probe filter leads to the generation of multi-cast probes once the region transitions to a "dirty shared" (DS) state. These probes and probe responses can cause bottlenecks at the cross die or socket links, thereby limiting performance when the design is scaled. In many applications, many of the probes are unnecessary because the requested lines have remained clean. A widely shared clean workload can cause a large number of multicast probes because at least one line in the region is presumed dirty.

In one implementation, a computing system implements a demote superprobe to mitigate this issue, where a superprobe is a probe that is directed to multiple destinations (e.g., every line of a region). In such a system, certain trigger conditions that precede the above scenario can cause a demote superprobe to be transmitted to any caches containing lines in the entire region for which a trigger condition is detected. The demote superprobe changes any "exclusive" (E) cache lines of the region to "shared" (S) cache lines, without changing any other coherency states. The demote superprobe also determines whether any lines in the region are "dirty" (D), and the region's coherency state is updated accordingly in the region-based probe filter. If the demote superprobe finds any dirty lines in the region, the region's coherency state is corrected to a "modified shared" (MS) state. If no dirty lines are found, the region state is corrected to a "clean shared" (CS) state. Accordingly, the generation of excess multicast probes is avoided for regions that are "clean shared" (CS), while probes are still generated appropriately for "modified shared" (MS) regions that are known to have modified lines.

FIG. 1 is a block diagram of one implementation of a computing system 100 that implements region based probe filters with demote superprobes. The computing system 100 includes multiple core complexes 105A-N and multiple home nodes 130A-N. Computing system 100 also includes, input/output (I/O) interfaces 120, data fabric/bus 125, and network interface 135. In other implementations, computing system 100 may include other components and/or be arranged in other configurations.

In one implementation, each core complex 105A-N includes processing components, such as one or more processor cores or other specialized processing components. Each processor core within core complex 105A-N includes a cache subsystem with one or more levels of caches. In one implementation, the cache subsystem includes a shared cache connected to each core complex 105A-N(e.g., L3 cache 230 in FIG. 2). In some implementations, one or more core complexes 105A-N may include a data parallel processor with a highly parallel architecture, such as one or more of graphics processing units (GPUs), digital signal processors (DSPs), field programmable gate arrays (FPGAs), application specific integrated circuits (ASICs), and so forth. As used herein a "core complex" can also be referred to as a "processing node" or a "CPU" or "CPU complex".

In one implementation, home node(s) 130 may include one or more of a coherent slave, a cache directory, and a memory controller coupled to any number and type of memory devices (not shown). For example, the memory device(s) coupled to home node(s) 130 may include Dynamic Random Access Memory (DRAM), Static Random Access Memory (SRAM), NAND Flash memory, NOR flash memory, Ferroelectric Random Access Memory (Fe-RAM), or others.

I/O (input/output) interfaces 120 are representative of any number and type of I/O interfaces, for example but not limited to the various types of peripheral component interconnect (PCI) buses, gigabit Ethernet (GBE) bus, universal serial bus (USB), specialty processors (e.g., platform security processors, graphics processors), and system management logic. Various types of peripheral devices can be coupled to I/O interfaces 120. Such peripheral devices include (but are not limited to) displays, keyboards, mice, printers, scanners, joysticks or other types of game controllers, media recording devices, external storage devices, network interface cards, and so forth.

In various implementations, computing system 100 can be a server, desktop computer, laptop, mobile device, game console, streaming device, wearable device, or any of various other types of computing systems or devices. The number, orientation, and type of components illustrated in computing system 100 is by way of example only and can vary from implementation to implementation based on application and system architecture.

Figure 2:
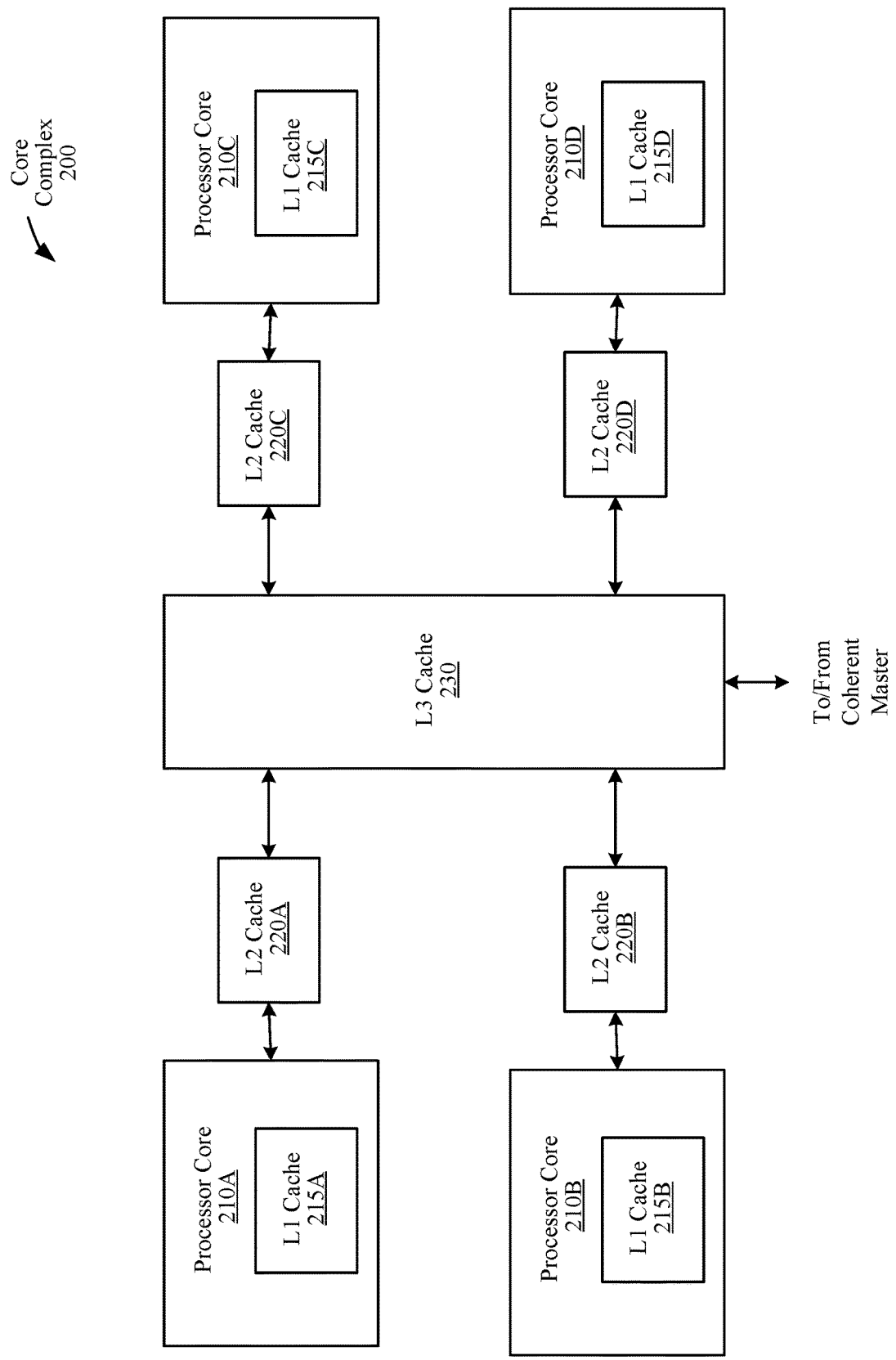
FIG. 2 is a block diagram of an implementation of a core complex.

FIG. 2 is a block diagram of one implementation of a core complex 200, for example, the core complexes 105A-N of FIG. 1. In one implementation, core complex 200 may include four processor cores 210A-D and a cache subsystem including L1 cache 215A-D, L2 cache 220A-D, and an L3 cache 230. The cache subsystem may include high-speed cache memories (e.g., L1 cache 215A-D, L2 cache 220A-D, and an L3 cache 230) configured to store blocks of data (not shown). As used herein, a "block" is a set of bytes stored in contiguous memory locations within the cache memories, which are treated as a unit for coherency purposes. Additionally, each of the terms "cache block", "block", "cache line", and "line" is interchangeable herein. In some implementations, a block can also be the unit of allocation and deallocation in a cache. A block may be retrieved from other caches within the system, such as from other core complexes (e.g., core complexes 105A-N of FIG. 1), or from the main memory, for example as may be retrieved through home node 130A of FIG. 1.

Additionally, in one implementation, the L3 cache 230 is shared by each of the processor cores 210A-D. L3 cache 230 is coupled to a coherent master for access to the data fabric (e.g., data fabric/bus 125 of FIG. 1) and memory subsystem (not shown). In other implementations, core complex 200 may include fewer or more processor cores (e.g., processor core 210A) and corresponding L2 caches (e.g., L2 cache 220A). In yet other implementations, core complex 200 may include other types of addressable cache subsystems that may include different numbers, types, and levels of cache memories without departing from the scope of this disclosure.

Figure 3:
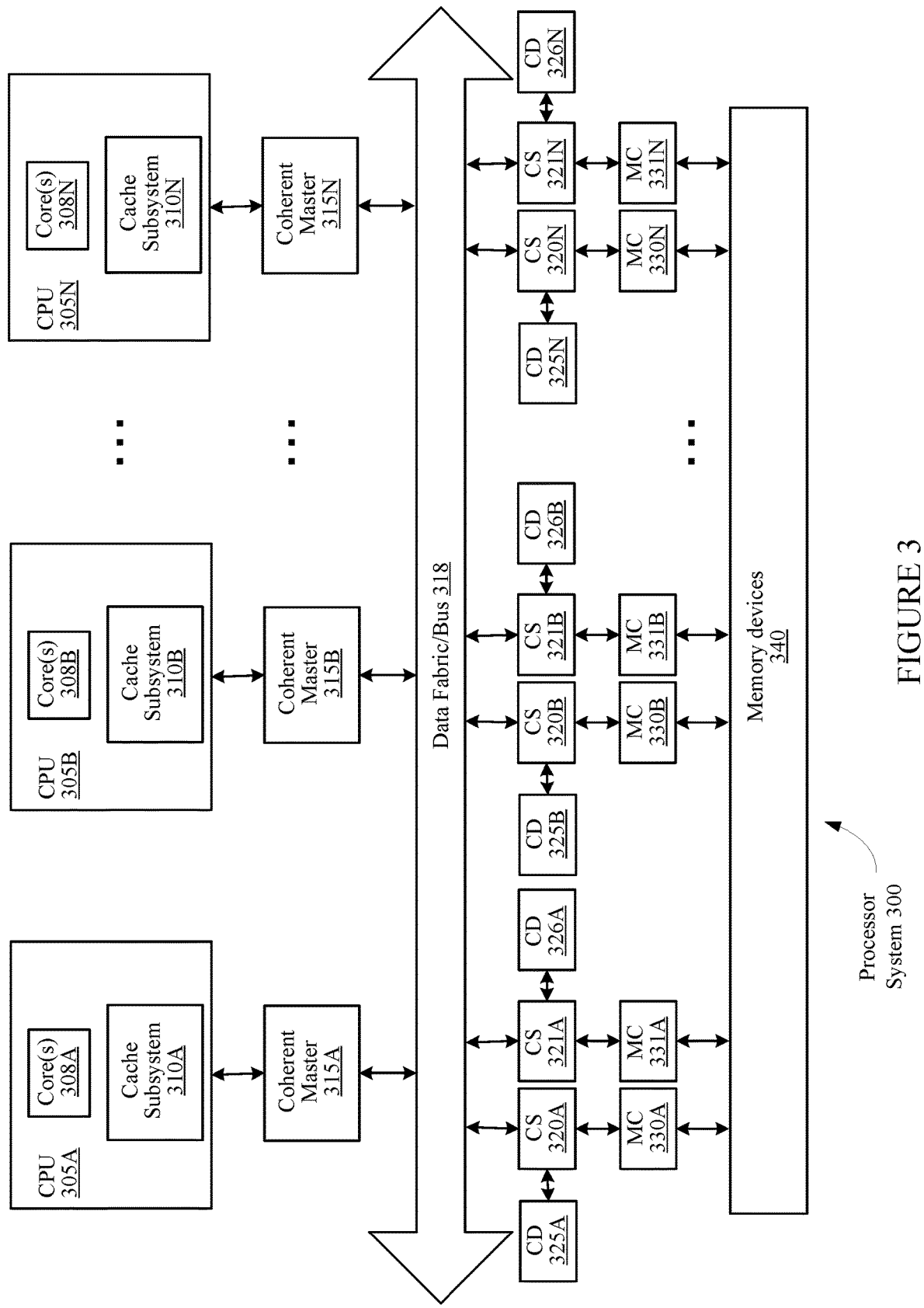
FIG. 3 is a block diagram of an implementation of a multi-CPU processor system.

FIG. 3 is a block diagram of one implementation of a processor system 300. In one implementation, processor system 300 includes multiple core complexes as illustrated by CPUs 305A-N. In various implementations, the number of CPUs (e.g., CPU 305A) and number of cores (e.g., cores 308A-N) per CPU may vary according to design choice. Each CPU 305A-N also includes a corresponding one of the cache subsystems 310A-N. In various implementations, the cache subsystems 310A-N may vary in size and structure as described above with reference to FIG. 2.

In one implementation, each CPU 305A-N is connected to a corresponding coherent master 315A-N that is further connected to a data fabric/bus 318. As used herein, a "coherent master" is defined as an agent including circuit components that process traffic flowing over an interconnect (e.g., data fabric/bus 318) and manages cache coherency, which includes each coherent master (e.g., coherent masters 315A-N) working in concert to generate, receive, and process coherency-related messages and probes for synchronizing copies of shared cache data within processor system 300.

In various implementations, each CPU 305A-N may be connected to one or more coherent slaves by a corresponding coherent master 315A-N and data fabric/bus 318. For example, CPU 305A may be connected to multiple coherent slaves that have access to each other's cache directories, such as, coherent slave (CS) 320A-D and coherent slave 321A-D, each connected through coherent master 315A and data fabric/bus 318. Coherent slave 320A is connected to memory controller (MC) 330A and cache directory (CD) 325A, while coherent slave 321A is coupled to memory controller 331A and cache directory 326A. Each memory controller 330A-N and 331A-N is connected to a respective one of the memory devices 340. One of the functions of each memory controller, such as memory controller 330A, is to provide the elements of the processor system 300 access to the memory devices 340. In various implementations, although shown as one block, the memory devices 340 may be a composed of one or more physical memories and may be of any type suitable for storing data, such as Dynamic Random Access Memory (DRAM), Static Random Access Memory (SRAM), etc.

In one implementation, each cache directory, for example cache directory 325A, includes one or more entries and each entry corresponds to a region in the memory 340. Each entry includes information to track cached data within the processor system 300 that corresponds to the data within the region in the memory 340. The region size, sometimes called page size, may be defined by a block of addresses in the memory 340, and which addresses may vary among implementations depending on how the memory is organized, for example, whether the memory is interleaved or not across channels and the memory address map base. In one implementation, one or more fields of an entry are configurable to change the page size of the region in the memory 340 that is being tracked by the cache directory.

In one implementation, the memory in devices 340 is divided up among each of the memory controllers 330A-N and 331A-N equally and each coherent slave (e.g., coherent slaves 320A-N and 321A-N) and their respective cache directories (e.g., cache directories 325A-N and 326A-N) manage a respective equal and contiguous portion of the memory. Alternatively, some or all of the memory devices 340 have differing memory capacities. In various implementations, a coherent slave may have access to one or more other coherent slave's cache directories. For example, coherent slave 320A may have access to multiple other cache directories within the processor system 300, such as 326A-N and 325B-N.

In one implementation, the coherent slaves 320A-N and 321A-N are each coupled with respective cache directories 325A-N and 326A-N, which serve as probe filters. When the coherent slave 320A receives a memory request targeting its corresponding memory controller 330A, the coherent slave 320A performs a lookup in its corresponding cache directory 325A to determine if the request targets data in a memory location encompassed within a region of the memory 340 tracked by an entry in the cache directory 325A, and whether the memory request results in a cache hit, meaning that the requested data can be found in the cache lines stored in the cache subsystem 310A-N associated with the region. In one implementation, if the lookup results in a hit, then the coherent slave 320A sends a probe to the CPU(s) (e.g., CPUs 305A-N) which are identified in the hit entry in the cache directory. The type of probe that is generated by the coherent slave 320A depends on the coherency state specified by the hit entry.

Although not shown in FIG. 3, in other implementations there may be other connections from data fabric/bus 318 to other components not shown to avoid obscuring the figure. For example, in another implementation, data fabric/bus 318 includes connections to one or more I/O interfaces and one or more I/O devices, such as shown in FIG. 1.

Figure 4:
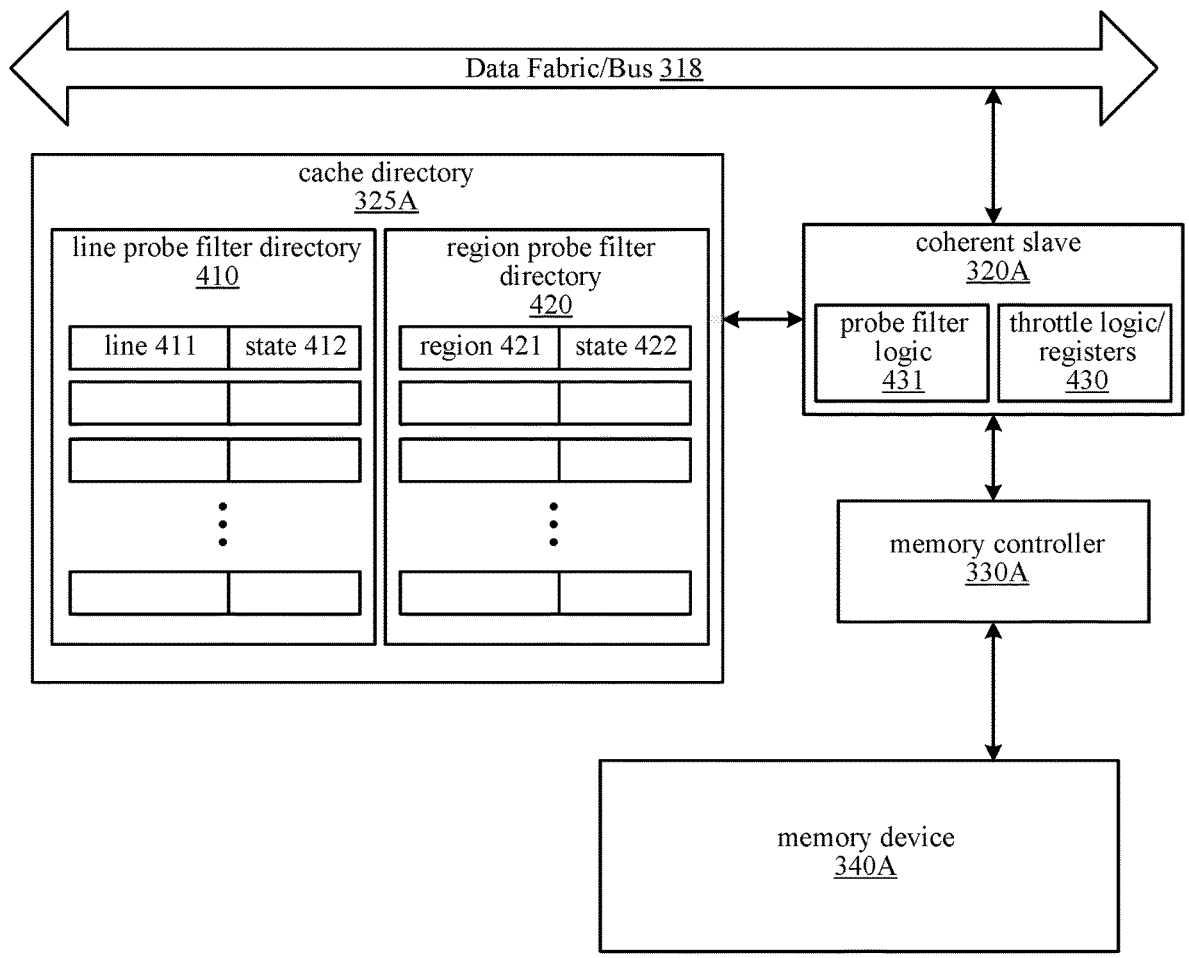
FIG. 4 is a block diagram of an implementation of a portion of a processor system.

FIG. 4 illustrates a portion of the processor system 300, according to an implementation. The cache directory 325A includes a line probe filter directory 410 and a region probe filter directory 420. The line probe filter directory 410 includes a set of entries each identifying a cache line 411 (e.g., with an address or other identifier) and associating it with a coherency state 412. The region probe filter directory 420 includes a set of entries each identifying a region 421 of memory in the memory device 340A and associating the region 421 with a coherency state 422. In one implementation, the region is a memory page. The line 411 and region 421 fields identify cache lines and regions by their address (e.g., a base address) or an address range. The coherency state fields 412 and 422 store values indicating the coherency states of the associated line or region, such as clean, dirty or modified, and exclusive or shared. Each entry in the line probe filter directory 410 and the region probe filter directory 420 may also include additional metadata for the identified lines or regions, such as valid bits, a reference count of the number of cache lines of the region which are cached somewhere in the processor system, etc.

A controller device such as the coherent slave 320A includes probe filter logic 431 that, together with the cache directory 325A, performs coherency actions by transmitting probes in response to memory access requests depending on whether the requested lines are cached, and depending on the coherency states and cached locations of the requested lines, as indicated by the cache directory 325A. The coherent slave 320A also includes throttle logic and registers 430 for performing throttling of demote superprobes. The registers are used to record metrics related to the demote superprobes (e.g., the number of outstanding demote superprobe recommendations, the number of failed demote superprobes, etc.) and the throttle logic compares the recorded metrics with one or more thresholds to determine whether to allow further demote superprobes to be recommended.

Figure 5:
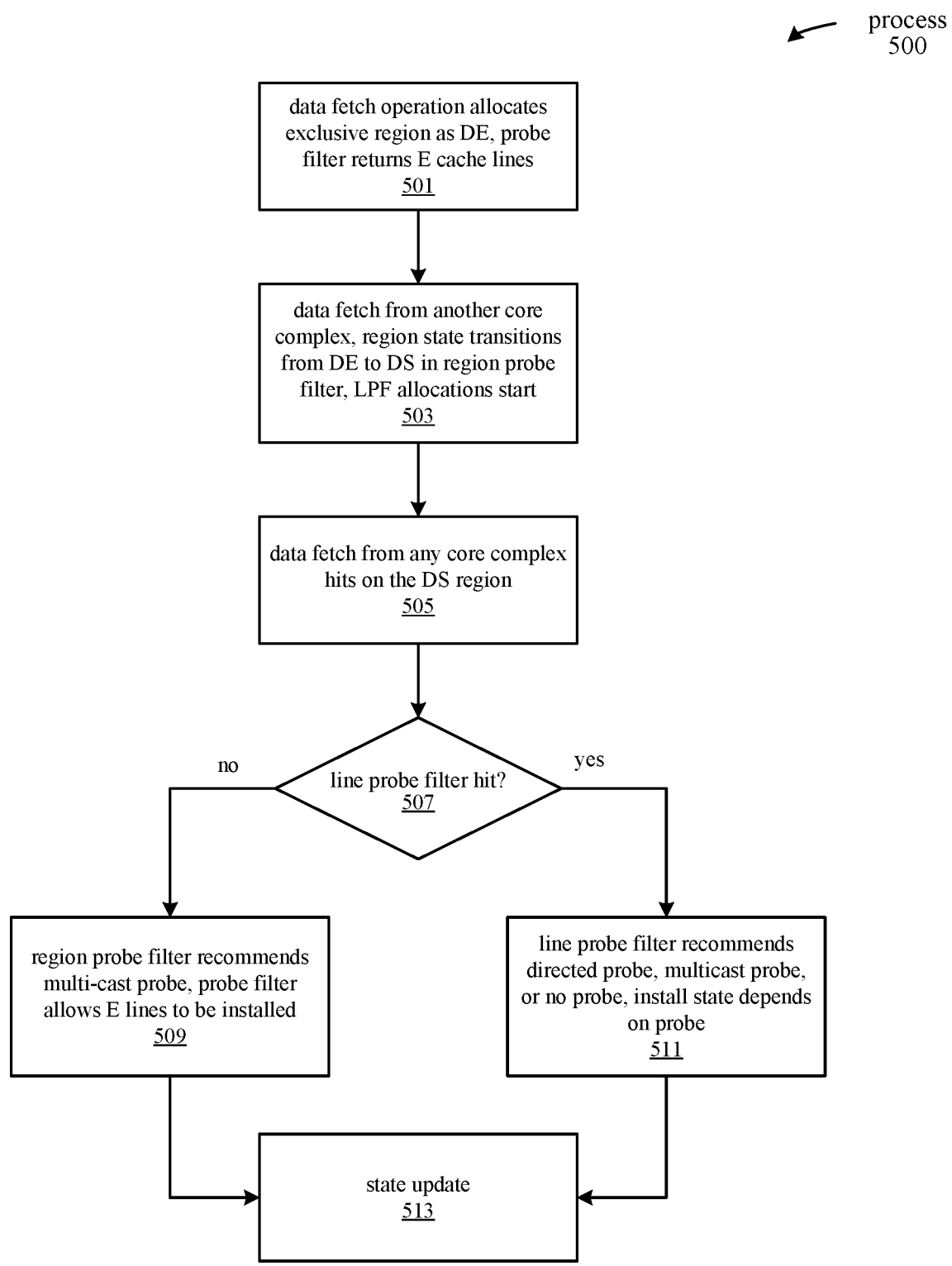
FIG. 5 is a flow diagram of a data fetch process in a processor system without demote superprobes enabled, according to an implementation.

FIG. 5 is a flow diagram illustrating operation of the processor system 300 when the demote superprobe functionality is disabled or unavailable, according to an implementation. In this implementation, widely shared clean data can result in congestion in the data fabric interconnect due to the lack of per-line accuracy in coherency state tracking.

At block 501, a data fetch operation allocates an "exclusive" (E) region. The data fetch opcode (e.g., RdBlkL) tries to return an "exclusive" (E) line whenever possible, and is directed to a memory region in the memory 340A when a data fetch is performed. In response to the data fetch, the probe filter implemented by coherent slave 320A and cache directory 325A returns "exclusive" (E) lines to the requesting core complex, which installs the lines in its cache subsystem. The region's coherency state is recorded in the region probe filter directory 420 as "dirty exclusive" (DE) since the returned line can be silently upgraded to the "modified" (M) state without the knowledge of the probe filter. That is, the probe filter does not receive any indication if or when the line is modified by the core complex, since the line is "exclusive" (E).

At block 503, a data fetch from a different core complex is directed to the same region, so the region's coherency state transitions from "dirty exclusive" (DE) to "dirty shared" (DS) in the region probe filter directory 420. To properly maintain cache coherency, the probe filter presumes that the region is "dirty" (D) in case an "exclusive" (E) line was modified without the probe filter's knowledge.

When a subsequent data fetch is received from any core complex that is directed to the region in the "dirty shared" (DS) state, as provided at block 505, then the line probe filter directory 410 is checked for the requested line.

If the line probe filter 410 contains an entry for the requested line at block 507, then the coherency state for the line can be determined from the entry, and the process continues at block 511.

At block 511, the line probe filter recommends a directed probe for the specific line, a multicast probe, or no probe, depending on the line's coherency state. The line is then installed in the requesting core's cache subsystem with an appropriate coherency state, which depends on the coherency state associated with the line in the line probe filter directory 410.

The requested line will not be found in the line probe filter directory 410, particularly when a workload is being processed that has a large memory footprint. The line probe filter directory 410 may be insufficient in size (e.g., it may be sized for communication variables) and will be thrashed and unable to provide the coherency state of most of the lines that are requested. Therefore, due to the lack of per-line fidelity in the design, probes are issued to ensure correctness when the line probe filter cannot provide the coherency state of the line. The process 500 thus continues from block 507 to block 509.

This leads to the generation of multi-cast probes once the region transitions to the "dirty shared" (DS) state and is subsequently hit by data fetch operations. At block 509, the region probe filter recommends a multi-cast probe directed to every line in the region. The multi-cast probes and probe responses can cause bottlenecks at cross die and/or socket links, thereby limiting the performance when the design is scaled. At block 509, the probe filter allows "exclusive" (E) lines to be installed in the cache of the requesting core complex.

The coherency state of the region's cache lines are updated at block 513, where appropriate, via the probes generated at block 509 or 511.

Figure 6:
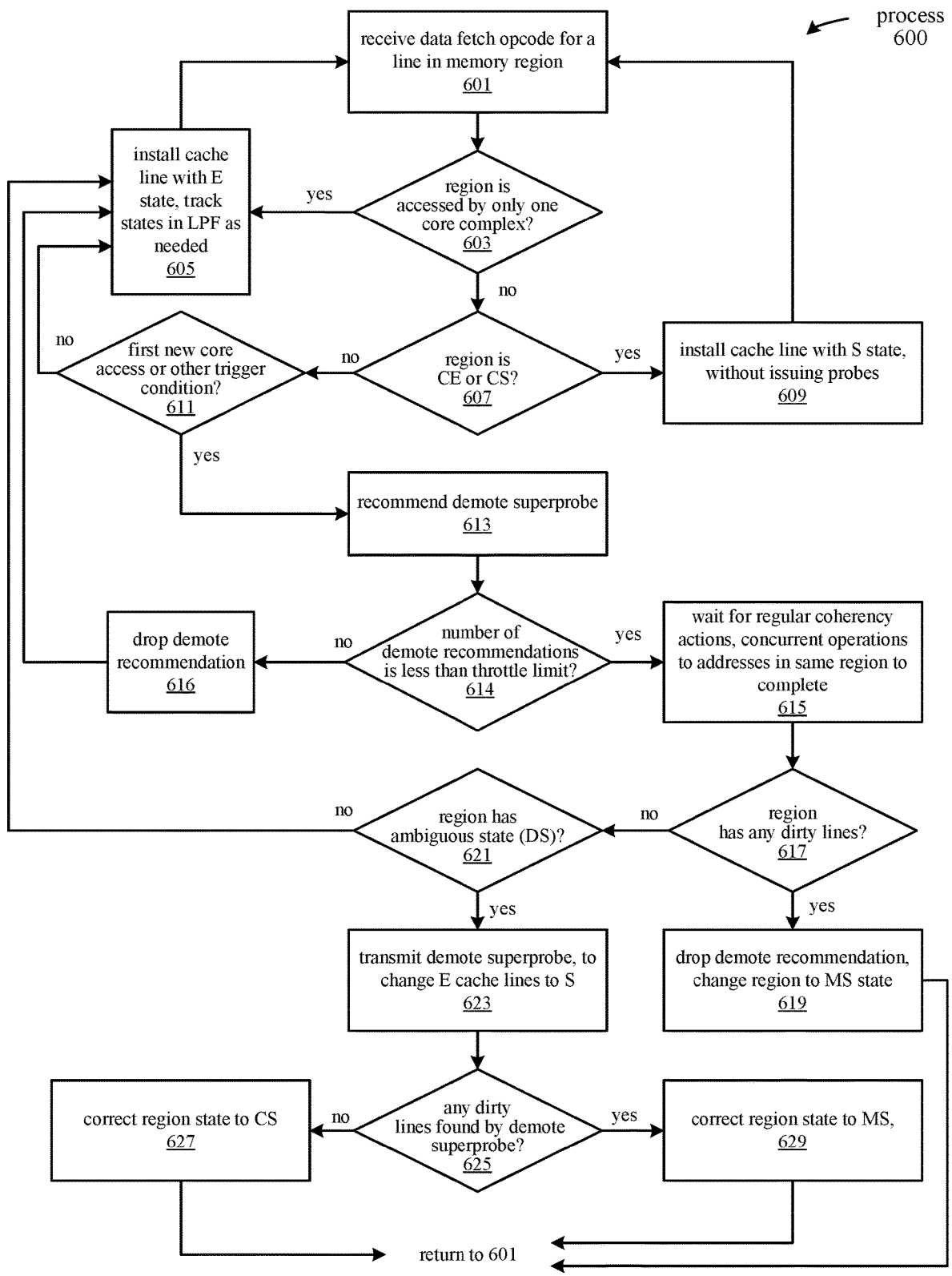
FIG. 6 is a flow diagram of a data fetch process in a processor system with demote superprobes enabled, according to an implementation.

FIG. 6 is a flow diagram illustrating operation of the processor system 300 with the demote superprobe functionality enabled, according to an implementation. The operations shown in FIG. 6 are performed by components of the processor system 300, including the cache directory 325A, coherent slave 320A, memory controller 330A, etc. In general, data fetch opcodes are issued by core complexes (e.g., CPU 305A) to fetch a line of data from memory. The data fetch is received by the coherent slave (e.g., coherent slave 320A) associated with the memory device in which the line is stored. The coherent slave obtains the requested line from the memory device via a memory controller and provides the line to the core complex to be installed in the core complex's cache subsystem. The coherent slave also performs actions for maintaining coherency of lines stored in different caches, such as transmitting coherency probes.

A core complex (e.g., core complex 305A) fetches data from one of the memory devices 340 by transmitting a data fetch opcode (e.g., RdBlkL) via the data fabric 318. At block 601, the data fetch opcode is received by coherent slave 320A. At block 603, if the memory region is being accessed by only one core complex (e.g., the core complex issuing the data fetch is the first core complex to access the region, and no other core complexes have accessed the region), then the process 600 continues at block 605. At block 605, the requested line from the memory region is installed in the cache subsystem of the core complex. A data fetch opcode such as RdBlkL returns an "exclusive" (E) line when possible, so the cache line is installed with an "exclusive" (E) coherency state. At this time, the line does not need to be tracked separately in the line probe filter directory. From block 605, the process 600 returns to block 601 to process subsequent data fetches. Subsequent data fetches from the same core complex that are directed to the same region are also installed in the cache with an "exclusive" (E) state via blocks 603 and 605.

At block 603, if more than one core complex is accessing the region (e.g., the data fetch is from a second core complex to access the region), then the process 600 continues at block 607. At block 607, the coherent slave 320A determines whether the region has a "clean exclusive" (CE) or "clean shared" (CS) coherency state by looking up the region in the region probe filter directory 420. If the region is in the "clean exclusive" (CE) or "clean shared" (CS) state, then at block 609, the cache line is installed in the cache subsystem of the requesting core complex with the "shared" (S) coherency state. No probes are generated by the coherent slave 320A because the region is "clean". From block 609, the process 600 returns to block 601 to continue processing subsequent data fetches.

At block 607, if the region is not in the "clean exclusive" (CE) or "clean shared" (CS) coherency state, then the process 600 continues at block 611. At block 611, the coherent slave 320A determines whether any of several trigger conditions have occurred. Trigger conditions can include, but are not limited to:

A first new core access, which occurs when a first data fetch from a second core complex to access the region that causes the region to transition from a "dirty exclusive" (DE) state to a "dirty shared" (DS) state.

A data fetch that hits a region in a "dirty shared" (DS) state and increments the Aggregate Reference Count (ARC) above a programmable threshold. The ARC tracks the number of lines from the region that have a copy cached in one of the caches.

The first data fetch hitting a region in a "dirty shared" DS state from a remote socket.

In one implementation, the coherent slave device records information about which core complexes have sent data fetches to a particular region in order to identify when trigger conditions have occurred. When no trigger condition is detected, then the requested line is installed in the requesting core complex's cache subsystem as provided at block 605.

At block 611, if one or more of the trigger conditions is detected, then the coherent slave recommends a demote superprobe, as provided at block 613. In one implementation, the demote superprobe recommendation is recorded by asserting a register bit or flag. In one implementation, the coherent slave includes a throttling function that adjusts a rate at which demote superprobe recommendations are generated based on one or more result metrics of demote operations within a monitored time period. Such an implementation may include static and dynamic throttling mechanisms for demote superprobes. For example, a static cap may be placed on the number of outstanding demote superprobe recommendations at any point in time. Dynamic throttling options include counters that count the number of eligible, recommended and failed demote operations over a running time window and provide programmable thresholds to increase or decrease the rate of demote recommendations to allow the design to dynamically adjust to the nature of the workload so the number of wasted demote superprobes can be minimized. "Eligible" means that the trigger conditions for the demote superprobe have been satisfied, "recommended" means that the eligibility is qualified by a dynamic throttle condition, and "failed" implies that a region transitioned from "clean shared" back to "modified shared", meaning that the rinse action by the failed superprobe was not warranted or was short-sighted.

In one implementation, counters and comparison logic for performing the throttling are included in the coherent slave devices 320A-N and 321A-N or alternatively, in the cache directories 325A-N and 326A-N. If throttling is enabled for the number of outstanding demote superprobe recommendations, the demote superprobe is recommended when the number of outstanding demote superprobes is less than a threshold limit. Then, the throttle logic 430 increments the number of outstanding demote superprobes when the demote superprobe is recommended.

At block 614, if throttling is enabled and the number of demote superprobe recommendations is not less than the threshold limit for throttling, then the recommendation is dropped at block 616, and the number of outstanding demote superprobe recommendations is decremented. The cache line is installed as provided at block 605, and the process 600 returns to block 601 to continue processing the next data fetch operation.

At block 614, if the number of demote superprobe recommendations is less than the threshold limit, then the process 600 continues at block 615. At block 615, regular coherency actions and concurrent operations to addresses in the same region are allowed to complete. These can include, for example, data fetch operations directed to other lines in the same region occurring in the same cycle, and their associated coherency actions such as probes. If, at block 617, the region has any dirty lines resulting from the operations of block 615, then the demote superprobe recommendation is dropped at block 619. For example, the bit or flag indicating the recommendation may be deasserted. If throttling is enabled, then the number of outstanding demote superprobes is decremented. The region is transitioned to a "modified shared" (MS) coherency state, which indicates without ambiguity that at least one of the lines in the region has been changed and is different from the data in the backing memory 340. From block 619, the process 600 returns to block 601 to continue processing data fetch operations.

If, at block 617, the region does not have any dirty lines, then the process 600 continues at block 621. If the region has an ambiguous "dirty shared" (DS) coherency state indicated in the region probe filter directory, this indicates that it is unknown whether any line in the region has actually been modified because it is possible that at least one of the lines could have been silently modified without any update to the cache directory 325A. If the region is not in the ambiguous "dirty shared" (DS) state, the process 600 installs the requested cache line as provided at block 605. Coherency states for individual lines are tracked in the line probe filter directory 410 as appropriate.

At block 621, if the region is associated with the ambiguous "dirty shared" DS state in the region probe filter 420, then the coherent slave device 320A transmits the demote superprobe as provided at block 623. The demote superprobe is a multi-cast coherency probe that is directed to all of the cache lines associated with the memory region, and demotes (i.e., converts) cache lines with an "exclusive" (E) coherency state to the "shared" (S) coherency state without changing other coherency states. The converted cache lines can include cache lines installed in response to data fetch opcodes issued from multiple respective core complexes; thus, the cache lines may be distributed among multiple different cache subsystems of different core complexes.

In response to the demote superprobe, the coherent master devices associated with the hit cache lines return probe responses indicating whether or not the cache lines are dirty. At block 625, if the demote superprobe found any of the lines in the region to be dirty, then the region's coherency state is corrected to "modified shared" (MS) in the region probe filter directory 420. When the region is in the MS coherency state, cache lines are installed with the "exclusive" (E) coherency state in response to data fetches, and entries in the line probe filter 410 can be allocated for tracking coherency states of the dirty cache lines, as provided at block 605. At block 625, if the demote superprobe did not find any dirty lines in the region, then the region's coherency state is corrected to "clean shared" (CS) in the region probe filter directory 420. From block 627 or 629, the process 600 returns to block 601 to continue processing data fetches. With the region in the "clean shared" CS state, subsequent data fetches do not cause probes to be issued, and cache lines are installed in the "shared" (S) coherency state, as provided at block 609.

A method includes, in a cache directory, storing an entry associating a memory region with an exclusive coherency state, and in response to a memory access directed to the memory region, transmitting a demote superprobe to convert at least one cache line of the memory region from an exclusive coherency state to a shared coherency state.

The method further includes, in response to the memory access, determining whether the memory region is associated with one or more dirty cache lines, and in response to determining that the region is not associated with the one or more dirty cache lines, changing the coherency state of the memory region to a clean shared coherency state.

The method further includes, in response to a data fetch opcode directed to the memory region while the coherency state of the memory region is the clean shared coherency state, installing one or more cache lines with a shared coherency state.

In the method, the storing of the entry associating the memory region with the exclusive coherency state is responsive to a first data fetch opcode received from a first core complex that is directed to the memory region. The memory access is a second data fetch opcode received from a second core complex.

In the method, the at least one cache line includes a plurality of cache lines each installed in response to a data fetch opcode issued by a different respective core complex.

The method further includes, in response to the memory access, determining whether the memory region is associated with one or more dirty cache lines and, in response to determining that the memory region is associated with the one or more dirty cache lines, adding one or more entries in a line probe filter to track a coherency state for each of the one or more dirty cache lines.

The method further includes, after determining that the memory region is associated with the one or more dirty cache lines, in response to receiving a subsequent data fetch opcode directed to the memory region, installing a cache line with the exclusive coherency state.

In the method, the transmitting of the demote superprobe is further performed in response to determining that a number of outstanding demote superprobe recommendations is less than a threshold limit.

The method further includes adjusting a rate of generating demote superprobe recommendations based on one or more result metrics of demote operations within a monitored time period.

A computing device includes a cache directory to store an entry associating a memory region with an exclusive coherency state, and a controller device coupled with the cache directory and to, in response to a memory access directed to the memory region, transmit a demote superprobe to convert at least one cache line associated with the memory region from an exclusive coherency state to a shared coherency state.

In the computing device, the controller device further, in response to the memory access, determines whether the memory region is associated with one or more dirty cache lines, and in response to determining that the region is not associated with the one or more dirty cache lines, change the coherency state of the memory region to a clean shared coherency state.

In the computing device, the controller device further, in response to a data fetch opcode directed to the memory region while the coherency state of the memory region is the clean shared coherency state, installs one or more cache lines with a shared coherency state.

In the computing device, the cache directory stores the entry associating the memory region with the exclusive coherency state in response to a first data fetch opcode received from a first core complex that is directed to the memory region, and the memory access includes a second data fetch opcode received by the controller device from a second core complex.

In the computing device, the controller device further, in response to the memory access, determines whether the memory region is associated with one or more dirty cache lines. The cache directory further includes a line probe filter directory to, when the memory region is associated with the one or more dirty cache lines, store one or more entries to track a coherency state for each of the one or more dirty cache lines.

In the computing device, the controller device further, after determining that the memory region is associated with the one or more dirty cache lines, installs a cache line with the exclusive coherency state in response to receiving a subsequent data fetch opcode directed to the memory region.

In the computing device, the controller device performs the transmitting of the demote superprobe in response to determining that a number of outstanding demote superprobe recommendations is less than a threshold limit.

In the computing device, the controller device adjusts a rate of generating demote superprobe recommendations based on one or more result metrics of demote operations within a monitored time period.

A system includes a set of processor core complexes, a cache directory coupled with the set of processor core complexes to store an entry associating a memory region with an exclusive coherency state, and a controller device coupled with the cache directory to, in response to a memory access directed to the memory region, transmit a demote superprobe to convert at least one cache line associated with the memory region from an exclusive coherency state to a shared coherency state.

In the system, the cache directory further includes a region probe filter directory to store a first set of entries for tracking coherency states associated with a plurality of memory regions of a memory device, and a line probe filter directory to store a second set of entries for tracking coherency states of a plurality of cache lines associated with the memory device.

In the system, each processor core complex in the set of processor core complexes includes a cache device to store one or more cache lines associated with the memory region, and installed in the cache device in response to one or more data fetch opcodes issued by the processor core complex.

As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain implementations may be implemented as a computer program product that may include instructions stored on a non-transitory computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The non-transitory computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions.

Additionally, some implementations may be practiced in distributed computing environments where the computer-readable medium is stored on and/or executed by more than one computer system. In addition, the information transferred between computer systems may either be pulled or pushed across the transmission medium connecting the computer systems.

Generally, a data structure representing the computing system 100 and/or portions thereof carried on the computer-readable storage medium may be a database or other data structure which can be read by a program and used, directly or indirectly, to fabricate the hardware including the computing system 100. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist including a list of gates from a synthesis library. The netlist includes a set of gates which also represent the functionality of the hardware including the computing system 100. The netlist may then be placed and routed to produce a data set describing geometric shapes to be applied to masks. The masks may then be used in various semiconductor fabrication steps to produce a semiconductor circuit or circuits corresponding to the computing system 100. Alternatively, the database on the computer-readable storage medium may be the netlist (with or without the synthesis library) or the data set, as desired, or Graphic Data System (GDS) II data.

Although the operations of the method(s) herein are shown and described in a particular order, the order of the operations of each method may be altered so that certain operations may be performed in an inverse order or so that certain operations may be performed, at least in part, concurrently with other operations. In another implementation, instructions or sub-operations of distinct operations may be in an intermittent and/or alternating manner.

In the foregoing specification, the implementations have been described with reference to specific exemplary implementations thereof. It will, however, be evident that various modifications and changes may be made thereto without departing from the broader scope of the implementations as set forth in the appended claims. The specification and drawings are, accordingly, to be regarded in an illustrative sense rather than a restrictive sense.

We claim:

1. A method, comprising:
    storing an entry associating a memory region with an exclusive coherency state; and
    in response to a memory access directed to the memory region, transmitting a demote superprobe to convert at least one cache line of the memory region from an exclusive coherency state to a shared coherency state.

2. The method of claim 1, further comprising:
    changing the coherency state of the memory region to a clean shared coherency state, based on the memory region not being associated with the one or more dirty cache lines.

3. The method of claim 2, further comprising:
    in response to a data fetch opcode directed to the memory region while the coherency state of the memory region is the clean shared coherency state, installing one or more cache lines with a shared coherency state.

4. The method of claim 1, wherein:
    the storing of the entry associating the memory region with the exclusive coherency state is responsive to a first data fetch opcode received from a first core complex that is directed to the memory region; and
    the memory access is a second data fetch opcode received from a second core complex.

5. The method of claim 1, wherein:
    the at least one cache line includes a plurality of cache lines each installed in response to a data fetch opcode issued by a different respective core complex.

6. The method of claim 1, further comprising:
    adding one or more entries in a line probe filter to track a coherency state for each of the one or more dirty cache lines, based on the memory region being associated with one or more dirty cache lines.

7. The method of claim 6, further comprising, after the memory region is associated with the one or more dirty cache lines:
    installing a cache line with the exclusive coherency state based on receiving a subsequent data fetch opcode directed to the memory region.

8. The method of claim 1, wherein:
    the transmitting of the demote superprobe is further performed based on a number of outstanding demote superprobe recommendations being less than a threshold limit.

9. The method of claim 1, further comprising:
    adjusting a rate of generating demote superprobe recommendations based on one or more result metrics of demote operations within a monitored time period.

10. A computing device, comprising:
a cache directory configured to store an entry associating a memory region with an exclusive coherency state; and
a controller device coupled with the cache directory and configured to, in response to a memory access directed to the memory region, transmit a demote superprobe to convert at least one cache line associated with the memory region from an exclusive coherency state to a shared coherency state.

11. The computing device of claim 10, wherein the controller device is further configured to:
change the coherency state of the memory region to a clean shared coherency state based on the region not being associated with the one or more dirty cache lines.

12. The computing device of claim 11, wherein the controller device is further configured to:
in response to a data fetch opcode directed to the memory region while the coherency state of the memory region is the clean shared coherency state, install one or more cache lines with a shared coherency state.

13. The computing device of claim 10, wherein:
the cache directory is configured to store the entry associating the memory region with the exclusive coherency state in response to a first data fetch opcode received from a first core complex that is directed to the memory region; and
the memory access includes a second data fetch opcode received by the controller device from a second core complex.

14. The computing device of claim 10, wherein:
the cache directory further comprises a line probe filter directory configured to, when the memory region is associated with the one or more dirty cache lines, store one or more entries to track a coherency state for each of the one or more dirty cache lines.

15. The computing device of claim 14, wherein:
the controller device is further configured to, when the memory region is associated with the one or more dirty cache lines, install a cache line with the exclusive coherency state in response to receiving a subsequent data fetch opcode directed to the memory region.

16. The computing device of claim 10, wherein:
the controller device is configured to perform the transmitting of the demote superprobe based on a number of outstanding demote superprobe recommendations being less than a threshold limit.

17. The computing device of claim 10, wherein:
the controller device is configured to adjust a rate of generating demote superprobe recommendations based on one or more result metrics of demote operations within a monitored time period.

18. A system, comprising:
a set of processor core complexes;
a cache directory coupled with the set of processor core complexes and configured to store an entry associating a memory region with an exclusive coherency state; and
a controller device coupled with the cache directory and configured to, in response to a memory access directed to the memory region, transmit a demote superprobe to convert at least one cache line associated with the memory region from an exclusive coherency state to a shared coherency state.

19. The system of claim 18, wherein the cache directory further comprises:
a region probe filter directory configured to store a first set of entries for tracking coherency states associated with a plurality of memory regions of a memory device; and
a line probe filter directory configured to store a second set of entries for tracking coherency states of a plurality of cache lines associated with the memory device.

20. The system of claim 18, wherein:
each processor core complex in the set of processor core complexes comprises a cache device configured to store one or more cache lines
associated with the memory region, and
installed in the cache device in response to one or more data fetch opcodes issued by the processor core complex.

* * * * *